(12) United States Patent
Mikhailov et al.

(10) Patent No.: US 9,419,711 B2
(45) Date of Patent: Aug. 16, 2016

(54) MEASURING IN-BAND OPTICAL SIGNAL-TO-NOISE RATIO (OSNR)

(71) Applicant: OFS Fitel, LLC, Norcross, GA (US)

(72) Inventors: Vitaly Mikhailov, Dunellen, NJ (US); Paul S Westbrook, Bridgewater, NJ (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 14/028,890

(22) Filed: Sep. 17, 2013

(65) Prior Publication Data

US 2014/0079388 A1  Mar. 20, 2014

Related U.S. Application Data

(60) Provisional application No. 61/702,228, filed on Sep. 17, 2012.

(51) Int. Cl.
*H04B 10/079* (2013.01)
*G01J 4/00* (2006.01)

(52) U.S. Cl.
CPC .................. *H04B 10/07953* (2013.01)

(58) Field of Classification Search
CPC ............... H04B 10/07953; H04B 10/2569; H04B 10/2572
See application file for complete search history.

(56) References Cited

U.S. PATENT DOCUMENTS

| | | | | |
|---|---|---|---|---|
| 5,872,540 A * | 2/1999 | Casabona | ............... | G01S 1/045 342/362 |
| 6,836,327 B1 * | 12/2004 | Yao | ........................... | G01J 4/00 356/367 |
| 8,422,882 B1 * | 4/2013 | Yao | .................. | H04B 10/07951 398/147 |
| 2002/0049372 A1 * | 4/2002 | Diab | .................. | A61B 5/14558 600/322 |
| 2003/0086144 A1 * | 5/2003 | Chou | ..................... | G02B 6/278 359/246 |
| 2003/0095313 A1 * | 5/2003 | Menikoff | ........... | H04B 10/2569 398/158 |
| 2004/0067057 A1 * | 4/2004 | Akiyama | ......... | H04B 10/07955 398/26 |
| 2004/0070766 A1 * | 4/2004 | Szafraniec | ................ | G01J 4/04 356/477 |

(Continued)

*Primary Examiner* — Oommen Jacob
(74) *Attorney, Agent, or Firm* — Sam Han, Esq.

(57) ABSTRACT

One measurement system comprises a polarimeter with a polarimeter detector bandwidth that partially overlaps with a signal bandwidth or completely overlaps with a signal bandwidth. The polarimeter measures a state of polarization (SOP) or a degree of polarization (DOP) of the signal in the presence of noise. The system further comprises a sampler that receives polarimeter signals from the polarimeter and samples those received signals at a specified sampling rate. The sampler outputs sampled data to a processor that calculates a mean DOP for the samples. Subsequently, the OSNR is determined from the calculated mean DOP.

17 Claims, 13 Drawing Sheets

(56) References Cited

U.S. PATENT DOCUMENTS

| | | | | |
|---|---|---|---|---|
| 2004/0247319 A1* | 12/2004 | Melman | H04B 10/077 | 398/65 |
| 2006/0115199 A1* | 6/2006 | Yao | G01M 11/337 | 385/11 |
| 2006/0215159 A1* | 9/2006 | Smith | G01N 21/21 | 356/367 |
| 2007/0140701 A1* | 6/2007 | Riposati | G02F 1/0136 | 398/152 |
| 2007/0146632 A1* | 6/2007 | Chipman | A61B 3/12 | 351/205 |
| 2007/0223078 A1* | 9/2007 | Yao | G01J 4/00 | 359/259 |
| 2009/0296089 A1* | 12/2009 | Smith | G01B 11/0641 | 356/367 |
| 2010/0315640 A1* | 12/2010 | Webb et al. | | 356/364 |
| 2011/0091206 A1* | 4/2011 | He | H04B 10/07953 | 398/26 |
| 2011/0149282 A1* | 6/2011 | Wagner | G01N 21/21 | 356/364 |
| 2011/0176132 A1* | 7/2011 | Goldberg | G01J 4/04 | 356/367 |
| 2011/0229143 A1* | 9/2011 | Buelow | H04B 10/2569 | 398/116 |
| 2012/0121254 A1* | 5/2012 | Ellison | H04B 10/2569 | 398/29 |
| 2013/0050702 A1* | 2/2013 | Li | G01J 3/02 | 356/369 |
| 2014/0071436 A1* | 3/2014 | Cyr | G01N 21/21 | 356/73.1 |
| 2014/0079388 A1* | 3/2014 | Mikhailov et al. | | 398/26 |
| 2015/0110486 A1* | 4/2015 | Sunnerud | H04J 14/06 | 398/26 |

\* cited by examiner

MEASURING IN-BAND OPTICAL SIGNAL-TO-NOISE RATIO (OSNR)

CROSS REFERENCE TO RELATED APPLICATIONS

This application claims the benefit of U.S. provisional patent application Ser. No. 61/702,228, filed 2012 Sep. 17, having the title "An Apparatus and the Measurement Technique to Measure In-Band Optical Signal-to-Noise Ratio and Polarization-Dependent Loss of Both Single- and Dual-Polarization Optical Channels," which is incorporated herein by reference in its entirety.

BACKGROUND

1. Field of the Disclosure

The present disclosure relates generally to optics and, more particularly, to systems and methods for measuring an optical signal-to-noise ratio (OSNR).

2. Description of Related Art

Optical signal-to-noise ratio (OSNR) is an important signal parameter in optical systems. This is because an optical system's data capacity, data quality, and various other quality factors are affected by the OSNR. For this reason, there are ongoing efforts to properly determine the OSNR of optical systems.

SUMMARY

The present disclosure provides systems and methods for measuring optical signal-to-noise ratio (OSNR). Briefly described, in architecture, one embodiment of the system comprises a polarimeter, a sampler to sample polarimeter signals, and a processor to distinguish between signal and noise from the sampled signals.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Single-Polarization Optical Channels (SPOC)

Figure 1:
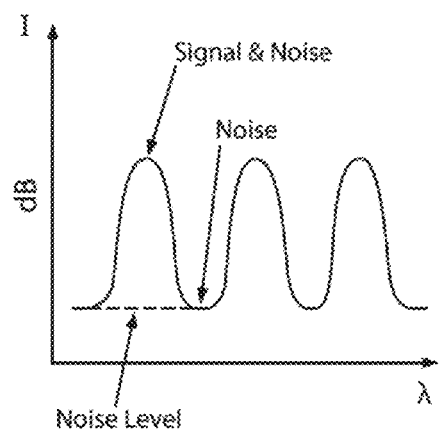
FIG. 1 is a graph showing optical channels with signals and a noise floor.
Figure 2:
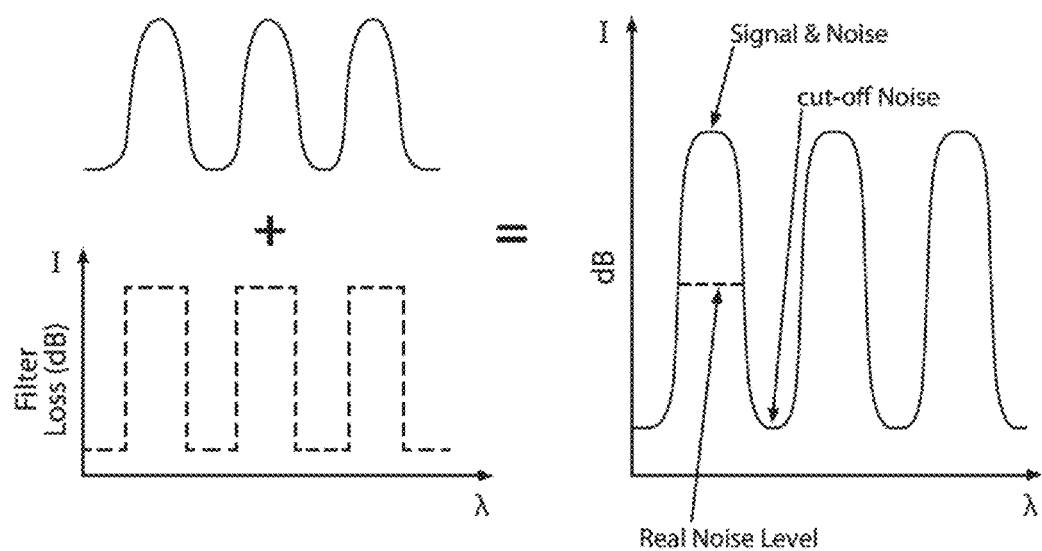
FIG. 2 is a graph showing filtered optical channels with a reduced noise floor.

Optical signal-to-noise ratio (OSNR) is useful for optical systems because it can provide insights on various quality factors, such as, for example, data capacity and data quality. For single-polarization optical channels (SPOC), the signal is polarized and has nearly 100 percent (%) degree of polarization (DOP), while the noise (which is random-Gaussian) is not polarized and has almost zero (0) percent DOP. Consequently, the OSNR of SPOC systems can be determined by measuring a polarized component, which represents the signal-carrying component, and then separately measuring an un-polarized component, which represents the noise. It should be noted that while two separate components are measured, the measurement itself can be performed in a single step. One problem in measuring OSNR is exemplified in FIG. 2, which shows data being carried in optical data channels at specified wavelengths ($\lambda$). As shown in FIG. 2, when filtered, the measurement within the optical data channels is higher than the noise level, which is measured between the optical data channels. The graph of FIG. 1 is typical of a point-to-point system without a reconfigurable optical add-drop multiplexer (ROADM) or other filter interposed between the endpoints. In other words, the graph of FIG. 1 represents an unfiltered point-to-point system. If, however, the signal is filtered, then the actual OSNR cannot be accurately measured because the system noise would be cut-off by the filter, as shown in FIG. 2 while the signal passes with minimal loss.

Consequently, in the presence of a filter (e.g., ROADM), the actual noise floor cannot be properly determined.

Figure 3A:
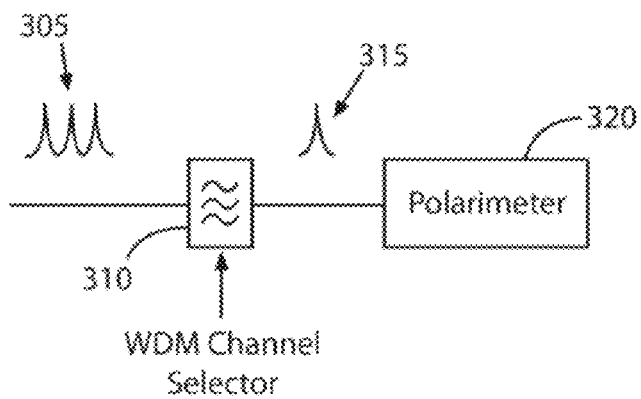
FIG. 3A is a diagram showing one embodiment of a system for measuring optical signal-to-noise ratio (OSNR) of a polarized signal.

For SPOC systems, the signal and the noise can be separately measured using a wavelength-division multiplexer (WDM) channel selector 310 in combination with a polarimeter 320, such as that shown in FIG. 3A. The WDM channel selector 310 receives the optical signals 305 and isolates a particular wavelength 315, which represents a signal from a particular optical data channel. That isolated wavelength 315 is input to the polarimeter 320, which then measures both a state of polarization (SOP) and a degree of polarization (DOP). In other words, the system of FIG. 3A separately measures un-polarized noise and the polarized signal in the presence of noise. The DOP is the ratio of polarized light to the total optical power (which represents both polarized and un-polarized components) and therefore in SPOC systems (where signal is polarized but noise is not) the DOP correlates to OSNR.

Figure 3B:
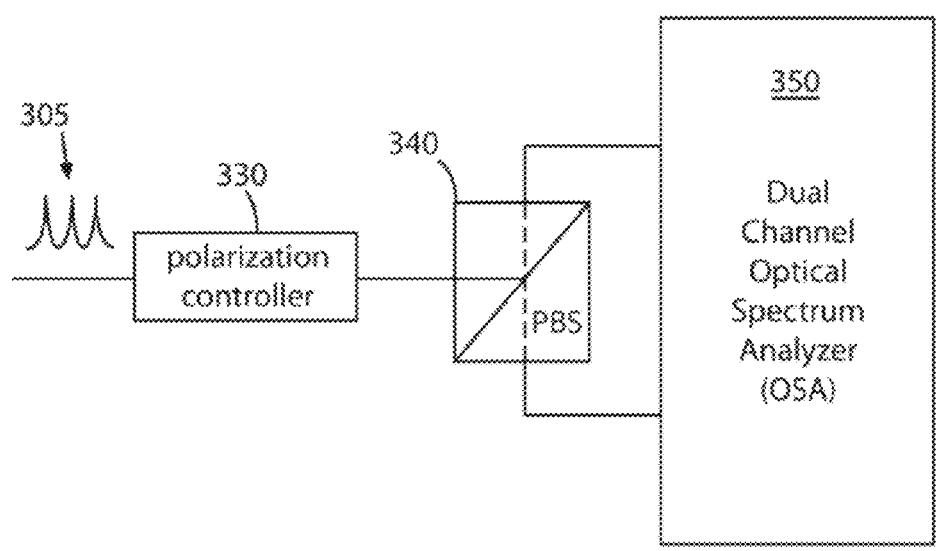
FIG. 3B is a diagram showing another embodiment of a system for OSNR of a polarized signal

As an alternative, the OSNR in SPOC systems can be measured using a technique that is known as polarization nulling, which is shown via the system of FIG. 3B. As shown in FIG. 3B, the SPOC system comprises a polarization controller 330, beam splitter 340, and a dual-channel optical spectrum analyzer (OSA) 350, as shown in FIG. 3B. The polarization controller 330 in combination with the beam splitter 340 results in minimization or nullification of power in one arm 342 (noise-only arm) of the beam splitter 340 and a propagation of the signal-plus-noise in the other arm 344 of the beam splitter 340. Due to the fact that signal is polarized while noise is not 340, the noise arm 342 carries half of the noise, while the signal arm 344 carries the signal and the other half of the noise. The OSNR can be determined by comparing the signals from both arms 342, 344.

Dual-Polarization Optical Channels (DPOC)

While the above-mentioned approaches can be used effectively for SPOC systems, these methods cannot be applied directly to systems that have dual-polarization optical channels (DPOC). For DPOC systems, information is carried on both polarization tributaries, with amplitude, frequency, and/or phase for each polarization tributary being varied independently. Consequently, the main distinction between signal and noise disappears when two independent tributaries are used to carry information, and the signal appears as being unpolarized (and virtually indistinguishable from noise) when measured by low-speed polarimetetry (e.g., detector bandwidth being less than the channel optical bandwidth)

On the other extreme, if one uses fast polarimetry (e.g., detector bandwidth being greater than or equal to the channel optical bandwidth), then the signal appears as polarized according to a polarization modulation pattern. For example, if 100% intensity modulation is used on two (2) orthogonal tributaries, then the pattern will have four (4) states, corresponding to vertical linear (01), horizontal linear (10), forty-five-degree linear (11), and no optical power (00). However, for fast polarimetry, the noise within the optical channel also appears as partially polarized with fast random variation of the state of polarization (SOP), and there is an implementation cost that is associated with using a polarimeter that has the same bandwidth as the signal bandwidth.

In sum, conventional approaches to measuring OSNR in SPOC systems are relatively ineffective in measuring OSNR in DPOC systems.

Distinguishing Signal from Noise in Dual-Polarization Optical Channels (DPOC)

In view of this deficiency in the art, the present disclosure provides various approaches to measuring OSNR in DPOC systems. In some of the disclosed embodiments, the OSNR of DPOC systems is measured by using a combination of fast polarimetry and slow polarimetry. A brief explanation is provided to facilitate understanding of this combination.

As noted above, slow polarimetry cannot distinguish between signal and noise in DPOC systems because the system and noise both appear without polarization for slow polarimetry. In other words, it is difficult, if not impossible, to distinguish a signal from noise based solely on a measured degree of polarization (DOP).

Figure 7:
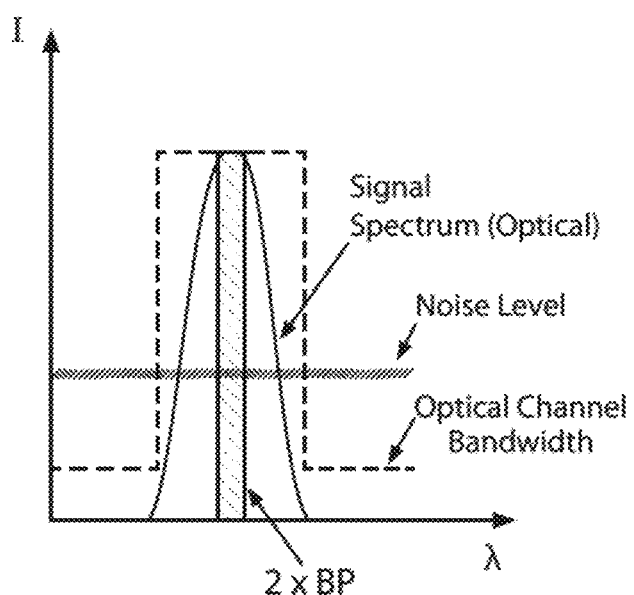
FIG. 7 is a graph showing one example of a signal spectrum within an optical channel.

Despite this, there is a difference between signal and noise, which is shown with reference to FIG. 7. Namely, noise has a relatively constant intensity and occupies the entire bandwidth of the channel, while the signal occupies only a certain portion of the channel and has a defined distribution across the channel bandwidth, with the distribution depending on various factors, such as modulation format, bitrate, and channel spacing. Consequently, the random-Gaussian noise will always appear to be random-Gaussian, irrespective of how that noise is transformed, and therefore will always have a near-zero DOP. Conversely, based on its spectral characteristics, the DOP of a signal can change with varying system parameters.

Figure 4A:
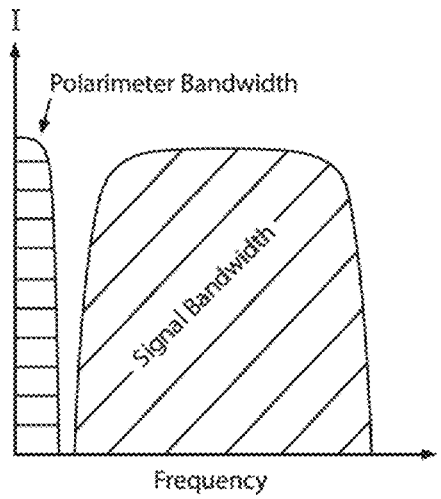
FIG. 4A is a graph showing one example of a polarimeter bandwidth compared to a signal bandwidth.
Figure 4B:
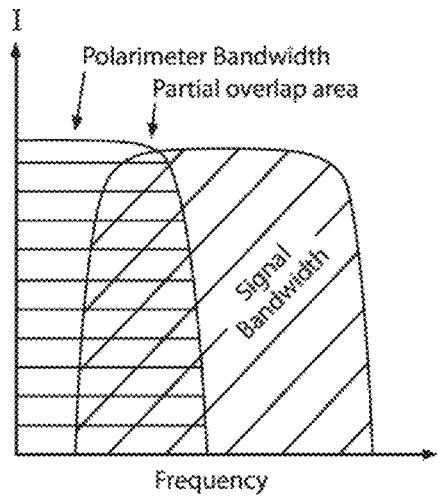
FIG. 4B is a graph showing another example of a polarimeter bandwidth compared to a signal bandwidth.
Figure 4C:
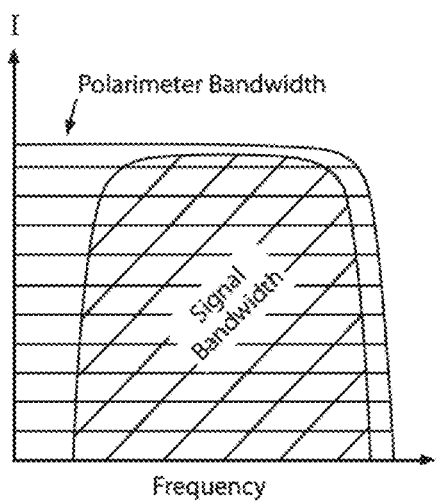
FIG. 4C is a graph showing yet another example of a polarimeter bandwidth compared to a signal bandwidth.

One embodiment of a measurement system comprises polarimeter with a polarimeter detector bandwidth that partially overlaps with a signal bandwidth (e.g., FIG. 4B) or completely overlaps with a signal bandwidth (e.g., FIG. 4C). As long as there is some overlap (unlike the graphs shown in FIG. 4A), the polarimeter can measure the state of polarization (SOP), and the DOP of the signal would be higher than noise-only or noise-affected-signal in the presence of the noise. The system further comprises a sampler that receives polarimeter signals from the polarimeter and samples those received signals at a specified sampling rate. The sampler outputs sampled data to a processor that calculates a mean DOP for the samples. Subsequently, the OSNR can be determined from the calculated mean DOP.

Having provided a general overview of how OSNR can be calculated form the mean DOP, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

Figure 5A:
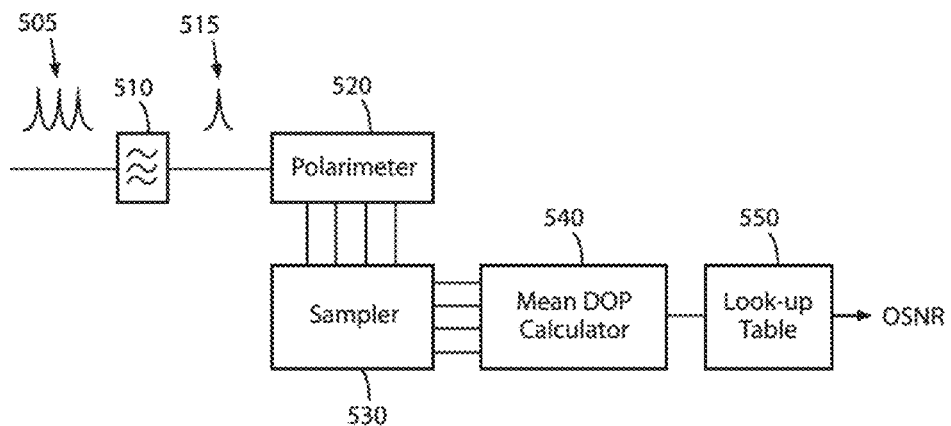
FIG. 5A is a diagram showing one embodiment of a system for measuring optical signal-to-noise ratio (OSNR) for an optical channel.

FIG. 5A is a diagram showing one embodiment of a system for measuring optical signal-to-noise ratio (OSNR) for a dual-polarization optical channel (DPOC). It should also be noted that the embodiment of FIG. 5A can also measure SPOC. As shown in FIG. 5A, this embodiment of the system comprises a wavelength division multiplexed (WDM) channel selector 510, a polarimeter 520, a sampler 530, a mean degree of polarization (DOP) calculator 540, and a look-up table (LUT) 550. The WDM channel selector 510 receives optical signals 505 and isolates a particular channel 515. The signal from that isolated channel 515 is input to the polarimeter 520. In the embodiment of FIG. 5A, the polarimeter bandwidth (BP) (also referenced as polarimeter electrical bandwidth) partially overlaps with the signal bandwidth (BS) such that BP<BS, similar to that shown in FIG. 4B. The output of the polarimeter 520 is input to the sampler 530, which preferably has a sampling rate of at least 2BP. The sampler 530 provides its output to the mean DOP calculator 540, which calculates the mean DOP for a large number (N) of samples. Thereafter, the calculated values for the mean DOP are related to OSNR via, for example, the LUT 550.

Figure 6:
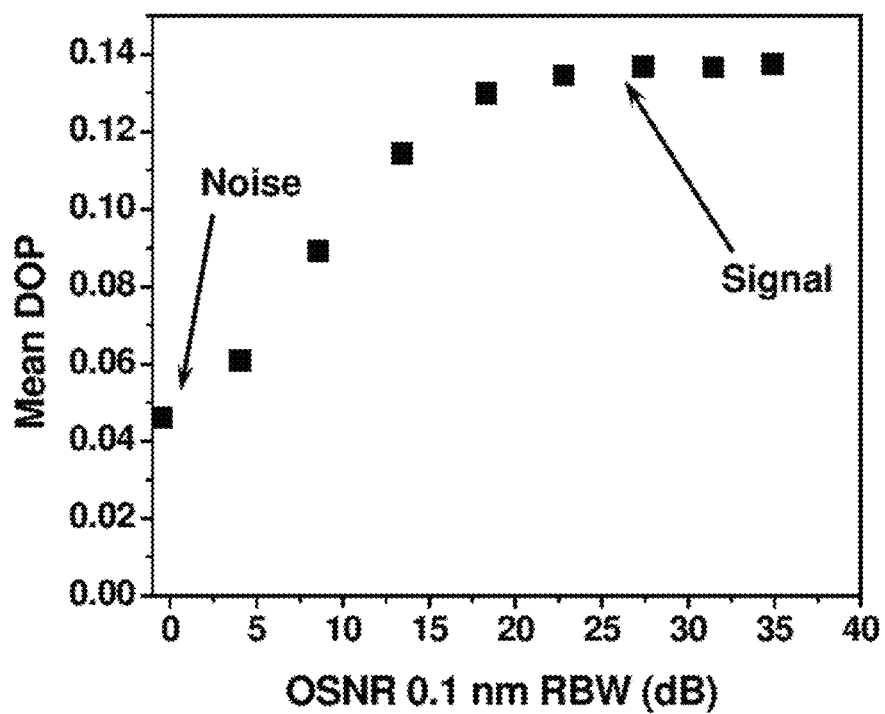
FIG. 6 is a graph showing one example of a mean degree of polarization (DOP) plotted as a function of OSNR.

One particular example of a numerical approximation of OSNR from a look-up table from mean DOP measurements is shown with reference to FIG. 6. Specifically, the graph of FIG. 6 shows mean DOP plotted as a function of OSNR (measured in decibels (dB)) at a one (1) nanometer (nm) resolution bandwidth for a 120 Gigabits per second (GB/s) dual-polarization quadrature-phase-shift keying (DP-QPSK) signal, with 15,000 samples analyzed. For the graph of FIG. 6, the polarimeter had a bandwidth of 500 megahertz (MHz), and the sampling rate was one (1) Gigasamples per second (GS/s). As shown in FIG. 6, the mean DOP varies as a function of OSNR between zero (0) to eighteen (18) dB, and thereafter reaching a plateau. The mean DOP at 0 dB represents a measurement of only the noise, while the mean DOP at the points after 35 dB represents a measurement of only the signal.

The difference in mean DOP values is due to the characteristic differences between the signal and the noise. Typically, the signal has a specific sequence that has a constant state of polarization (SOP) over a relatively large number of transmitted bits. Thus, the measured DOP is higher than average and, in principle, can be as high as 100% if the temporal length of the sequence exceeds 1/BP. Consequently, the presence of a signal increases the mean DOP. Conversely, since the noise is random-, the noise-SOP changes at a rate that is proportional to the channel optical bandwidth. As a result, it is extremely unlikely for the noise-SOP to remain constant over a time interval that is on the order of 1/BP, which results in a relatively flat and relatively-low noise spectrum over this time interval.

Figure 5B:
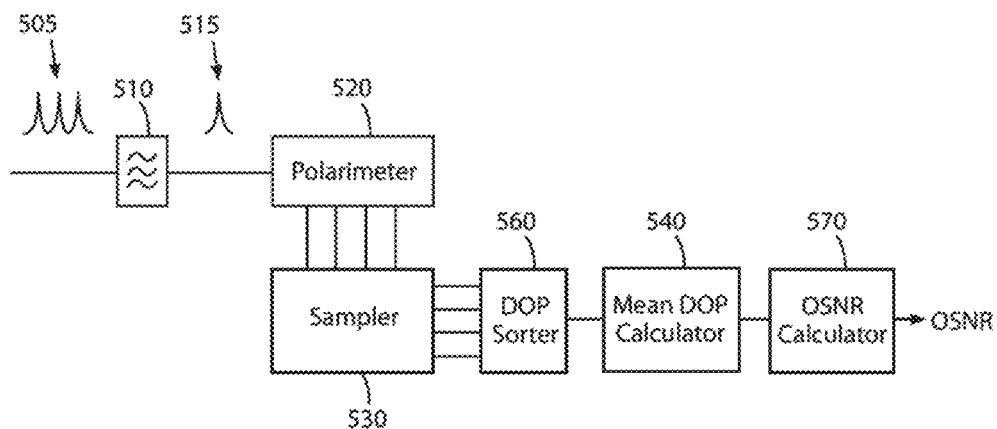
FIG. 5B is a diagram showing another embodiment of a system for measuring OSNR for a DPOC.

The embodiment of FIG. 5A can be improved by adding a DOP sorter 560, as shown in the embodiment of FIG. 5B. The embodiment of FIG. 5B comprises a WDM channel selector 510, a polarimeter 520, a sampler 530, a DOP sorter 560, a mean DOP calculator 540, and an OSNR calculator 570. Thus, unlike the embodiment of FIG. 5A, the output of the sampler 530 is input to the DOP sorter 560, which in turn provides its output to the mean DOP calculator 540. The DOP sorter 560 sorts the collected samples and selects a finite number (M) of samples with the highest DOP. The mean DOP calculator 540 then calculates the mean DOP of only those M samples. Thereafter, the OSNR calculator 570 calculates the OSNR from the mean DOP of the M samples. This OSNR calculation can be performed by a mathematical approximation or from a look-up table.

Figure 8:
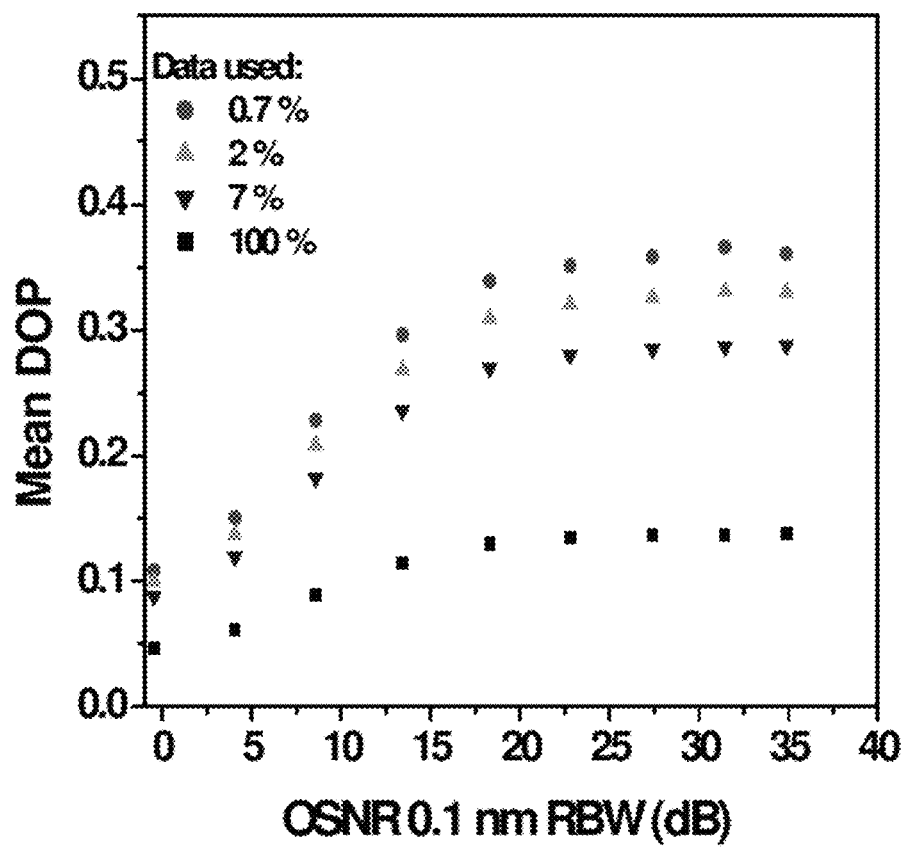
FIG. 8 is a graph showing one example of mean DOP plotted as a function of OSNR for various DOP value discriminators.

FIG. 8 is a graph showing one example of mean DOP plotted as a function of OSNR for various collected sample sizes. Specifically, the graph of FIG. 8 shows DOP plotted as a function of OSNR for 100, 300, 1 k, and 15 k samples out of N=15 k total samples. This corresponds to 0.7%, 2%, 7%, and 100%, respectively, of the highest mean DOP values from the collected data. As compared to the OSNR measurement range of the graph of FIG. 6 (which is 0-18 dB), the OSNR measurement range for FIG. 8 increases by 6 dB (to a range of 0-24 dB). Additionally, FIG. 8 shows that the mean DOP of the noise remains relatively unchanged (at approximately 10% for each of the M sub-samples), while the mean DOP of the signal increases dramatically as the highest DOP values are averaged. This is because, as shown in FIG. 7, the noise exhibits a relatively flat spectrum across M samples, while the signal exhibits a large DOP over M samples. Consequently, a tradeoff exists between measurement time, which is directly proportional N (the total number of samples), and both range and accuracy, which is also proportional to N. Furthermore, the accuracy and range can also improve with a proper selection of M (as long as M is not so small as to capture unusually high outliers in the noise).

Figure 9:
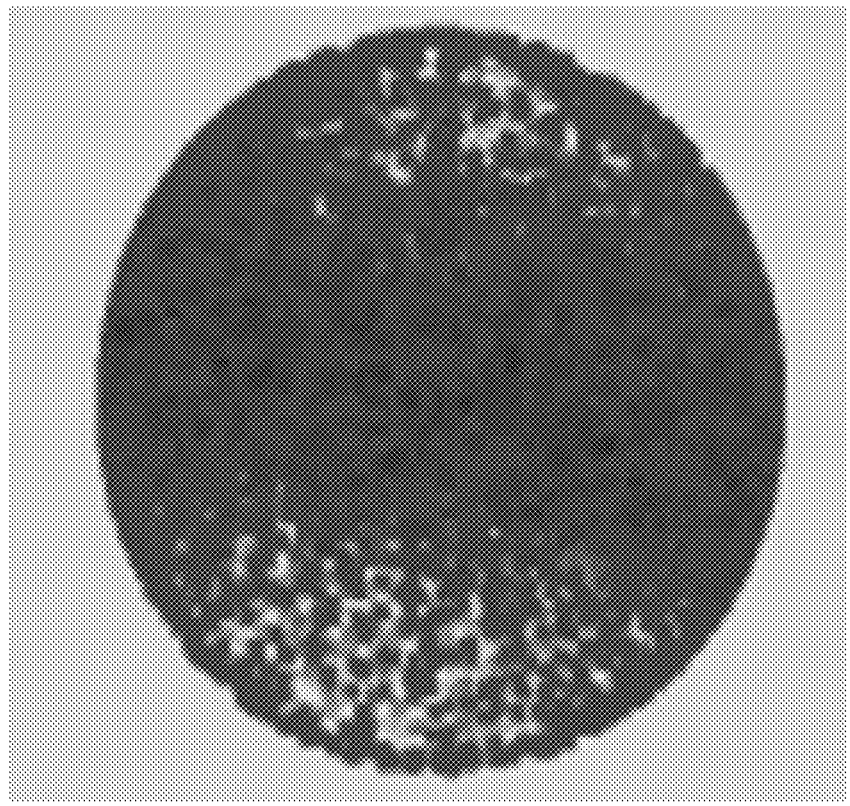
FIG. 9 is a diagram showing one embodiment of a Poincaré sphere with a normalized distribution for a 120 Gigabit (Gb) per second quadrature phase shift keyed (QPSK) signal measured by a polarimeter with a 500 Megahertz (MHz) bandwidth and sampled by a sampler at a sampling rate of 1 Gigasamples (GS) per second.

An alternative approach to analyzing polarimeter data is to analyze a normalized SOP pattern. FIG. 9 is a diagram showing one example of a Poincaré sphere with a normalized distribution for a 120 GB/s QPSK signal measured by a polarimeter with a 500 MHz bandwidth and sampled at rate of 1 GS/s.

It is worthwhile to note that one having skill in the art will appreciate that several different signal processing algorithms can be used on combination to further improve the dynamic range and accuracy of OSNR measurements. Furthermore, one of skill in the art will understand that various effects (e.g., chromatic dispersion (CD), polarization mode dispersion (PMD), fiber nonlinearities (NL), etc.) may affect the signal during transmission. Consequently, these transmission effects may affect the measured SOP and DOP of the signal. Thus, to reduce such transmission effects on OSNR, polarimeter bandwidth may be strategically selected so that the transmission effects are reduced. Furthermore, post-processing mechanisms (e.g., signal processing) can also be employed to reduce such transmission effects.

Figure 10:
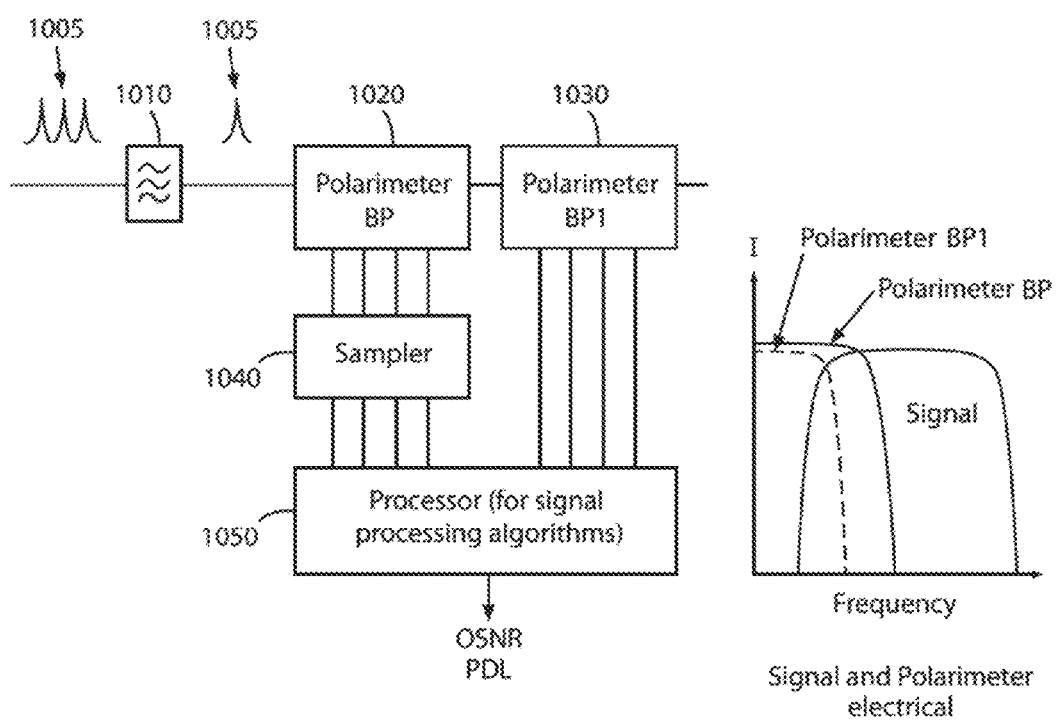
FIG. 10 is a diagram showing one embodiment of a system comprising more than one polarimeter.

It is also noted that polarization-dependent loss (PDL) is also caused by re-polarization (since the loss is polarization-dependent), thereby affecting measurements of in-band OSNR. One approach to mitigating PDL effects is by employing a second polarimeter, such as that shown in the embodiment of FIG. 10. The embodiment of FIG. 10 comprises a WDM channel selector 1010 that receives optical signals 1005 and selects a single optical channel 1015. The signals from the optical channel 1015 is input to a first polarimeter 1020 having a bandwidth of BP, then through a second polarimeter 1030 having a bandwidth of BP1, where BP1<<BP. The outputs of both the first polarimeter 1020 and the second polarimeter 1030 are input to a processor 1050, from which the OSNR and PDL can be determined.

Ideally, BP1 of the second polarimeter 1030 should be such that measured DOP for either the DPOC signal or the noise is as close to zero (0) as possible. When such a BP1 is selected, then the second polarimeter 1030 is unable to distinguish between the signal and the noise. However, since both the signal and noise are re-polarized to the same degree based on the PDL, the DOP measurement will increase proportionally to the PDL for the second polarimeter 1030 (or the slow polarimeter).

Figure 11:
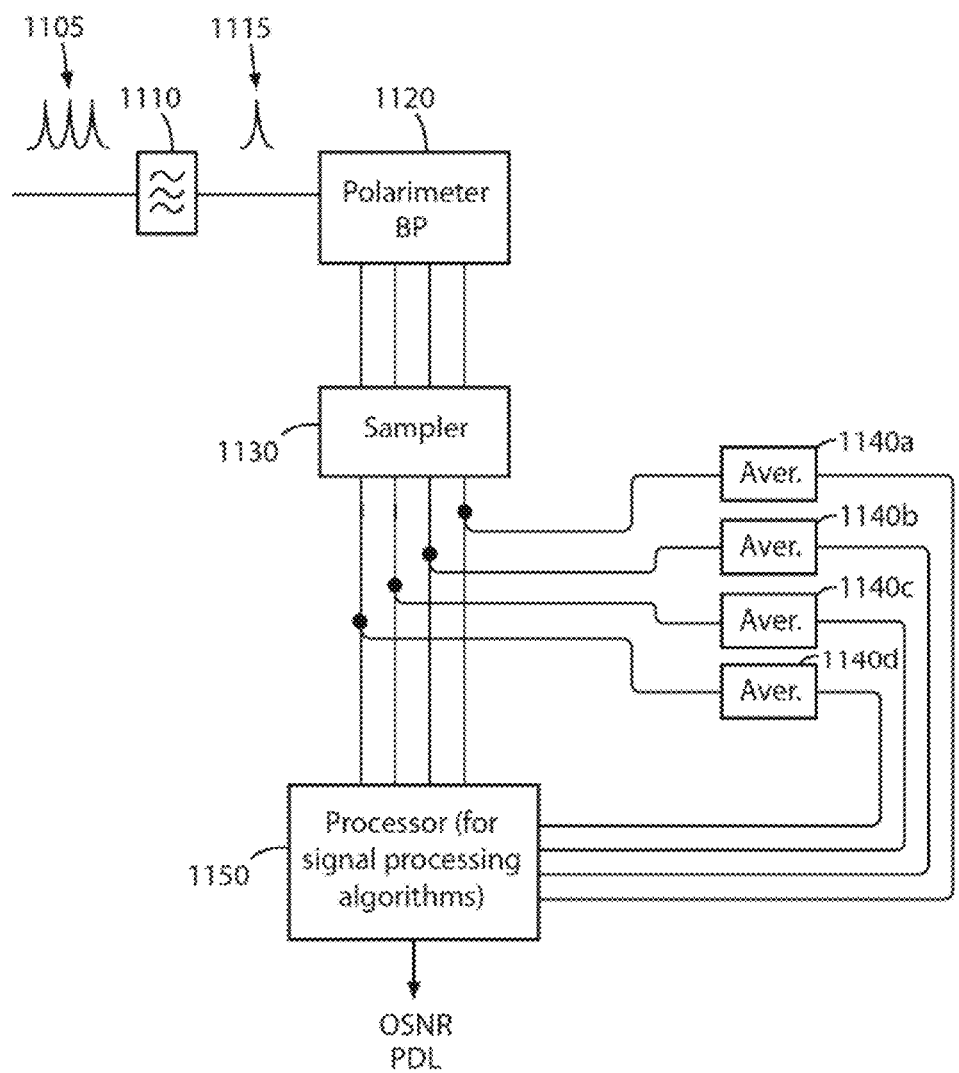
FIG. 11 is a diagram showing one embodiment of a system comprising signal taps.

An alternative to using a second polarimeter 1030 is shown in FIG. 11. The embodiment of FIG. 11 comprises a WDM channel selector 1110 that receives optical signals 1105 and selects an optical channel 1115. The signal from the optical channel 1115 is input to a polarimeter 1120 with a bandwidth of BP. The output of the polarimeter 1120 is input to a sampler 1130, which samples the polarized data. The output of the sampler 1130 is tapped 1140a, 1140b, 1140c, 1140d (collectively 1140), with the tapped signals being averaged and then input to a processor 1150. The output of the samplers 1130 is also provided as inputs to the processor 1150. Since the tapped-and-averaged signals are equivalent to the output of the second polarimeter 1030 (FIG. 10), the embodiment of FIG. 11 achieves similar results as those achieved from the embodiment of FIG. 10.

Figure 12:
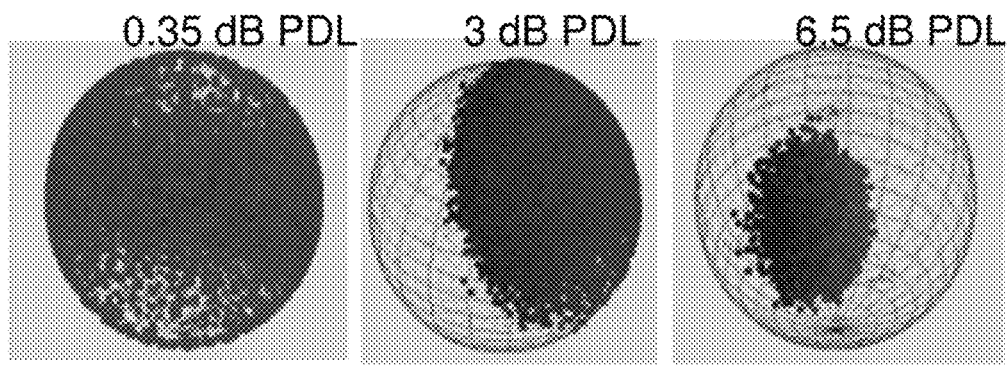
FIG. 12 is a diagram showing several examples of Poincaré spheres with normalized distributions for different amounts of polarization-dependent losses (PDL).

As an alternative, the SOP distribution on a Poincaré sphere can be analyzed to estimate PDL. As shown in FIG. 12, normalized distributions for different amounts of polarization-dependent losses (PDL) changes as a function of PDL. Namely, the normalized sphere coverage shrinks as the PDL increases. Specifically, as shown in the embodiment of FIG. 12, the Poincaré sphere shows a large normalized SOP sphere coverage at 0.35 dB PDL, a smaller coverage at 3 dB PDL, and an even smaller coverage at 6.5 dB PDL. Since various characteristics of Poincaré spheres are known in the art, further discussion of the Poincaré sphere is omitted here.

Figure 13A:
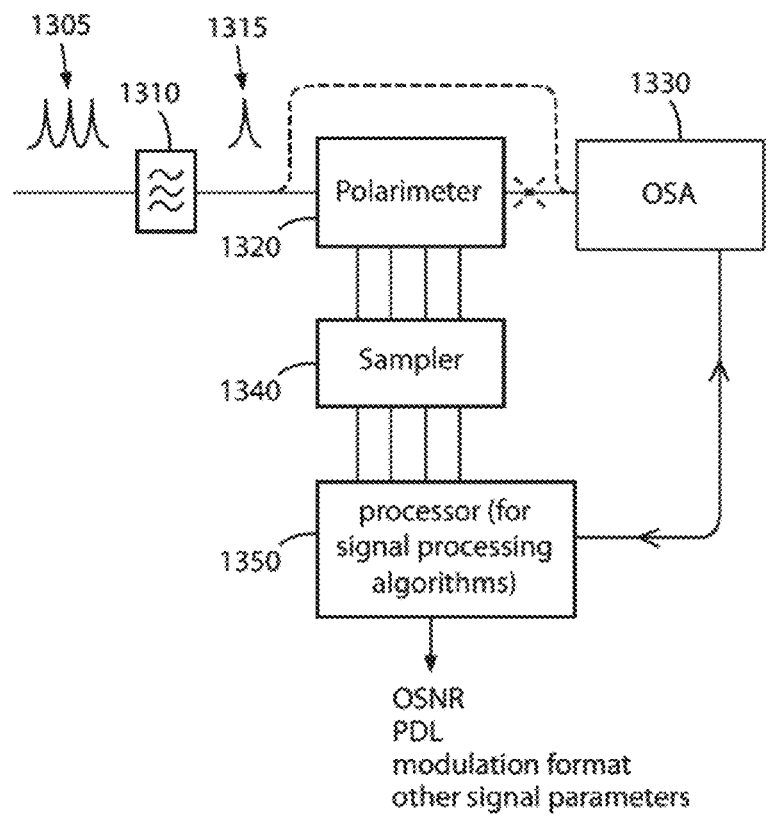
FIG. 13A is a diagram showing one embodiment of a system comprising a spectrometer.
Figure 13B:
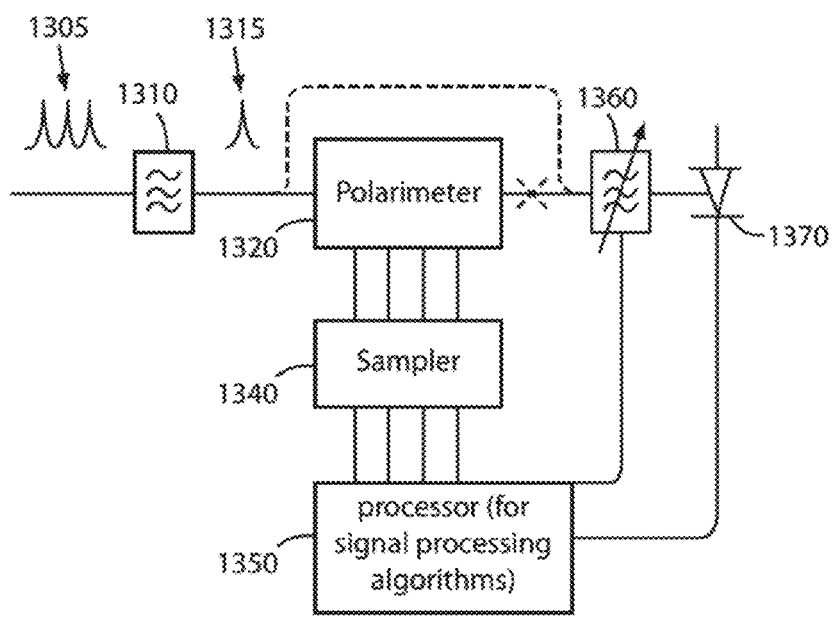
FIG. 13B is a diagram showing one embodiment of a system comprising a tunable filter and a photodetector.

Additional information about the signal spectrum and the channel bandwidth can also improve the estimate of OSNR. FIGS. 13A and 13B show two embodiments, among others, of systems that provide signal spectrum and channel bandwidth information.

As shown in FIG. 13A, this embodiment of the system comprises a WDM channel selector 1310 that receives optical signals 1305 and selects a channel 1315. Signals from the selected channel 1315 are input to a polarimeter 1320. The output of the polarimeter 1320 is input to a sampler 1340 and also to an optical spectrum analyzer (OSA) 1330. The sampled signal is input to a processor 1350, which is also operatively coupled to the OSA 1330. By including the OSA 1330, the system now has the capability to determine OSNR, PDL, modulation format, and other signal parameters (e.g., wavelength detuning, spectral power distribution, etc).

FIG. 13B is a diagram showing one embodiment of a system comprising a tunable filter 1360 and a photodetector 1370. Again, as will be appreciated by those of skill in the art, the tunable filter 1360 in combination with the photodetctor 1370 provides additional information that may be used in computing the OSNR.

In addition to the approaches shown with reference to FIGS. 5A through 13B, the measured DOP can be increased by adding specific data overhead to raw transmitted data. Embodiments of systems for adding such overhead are shown with reference to FIGS. 14A and 14B.

Figure 14A:
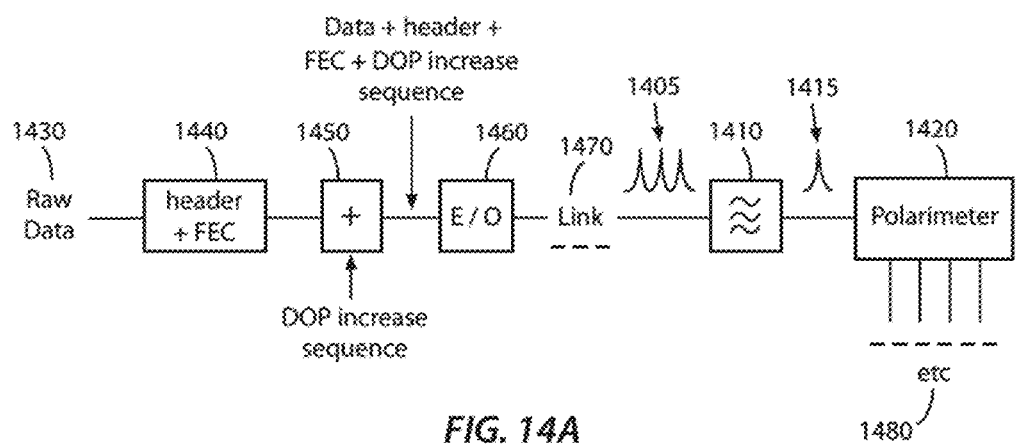
FIG. 14A is a diagram showing one embodiment of a system where data overhead is added to increase a measured degree of polarization (DOP).

FIG. 14A shows one embodiment of a system comprising an adder 1420 inserted after raw data has been framed and forward error correction (FEC) information has been added. The adder 1420 adds overhead in the form of a sequence that increases DOP. With the proper selection of the DOP-increasing sequence, overall improvement in OSNR measurements can be achieved with minimal increase in data overhead. This data with increased overhead is then transmitted through the link, and the embodiments of FIGS. 5A through 13B receive and process the received data, as described in detail, above.

Figure 14B:
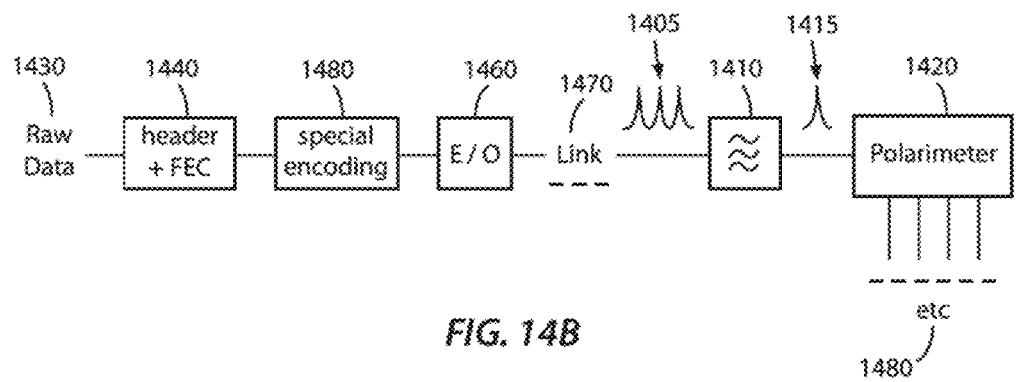
FIG. 14B is a diagram showing one embodiment of a system where data overhead is added to increase overall DOP.

Unlike FIG. 14A, the embodiment of FIG. 14B comprises a specific data encoder 1440, which encodes the data in such a way as to improve overall accuracy and dynamic range. Again, the encoded data is transmitted through the link, with the embodiments of FIGS. 5A through 13B receiving and processing the data, as described in detail, above. Since approaches to adding overhead, and approaches to employing different data encoding schemes are known in the art, further discussion of those schemes is omitted with reference to FIGS. 14A and 14B.

While FIGS. 5A through 13B show embodiments where there is a partial overlap between BP and BS, other embodiments may employ a full overlap of BP and BS, as shown in FIG. 4C. For complete overlap cases (FIG. 4C), the data signal will have a distinguishable signal pattern that is modulated according to its particular modulation format. Analyzing the SOP pattern on a Poincaré sphere (such as those shown in FIG. 9 or 12) and the signal DOP permits estimation of in-band OSNR, PDL, and other signal parameters. By way of example, random noise largely washes out the pre-determined signal pattern. Thus, any deviation of the SOP from the center of a polarization-modulated signal would likely be related to OSNR.

Additionally, signal DOP can be used to estimate an in-band OSNR. For example, if the polarimeter bandwidth (BP) is equal to the signal bandwidth (BS), then the signal DOP would be nearly 100% while the noise DOP would be lower. Thus, if noise is added to the signal, then the total DOP would be reduced from the initial, near-100% value. This reduction is proportional to the amount of added noise, thereby providing an indication of OSNR.

As one can see from the detailed descriptions, as provided above, by using a combination of slow polarimetry and fast polarimetry, the OSNR can be determined from measured and calculated values of mean DOP. Thus, unlike conventional systems that were only applicable to SPOC systems, the above-described embodiments permit estimation of OSNR in DPOC systems that were previously difficult, if not impossible, to obtain using the conventional SPOC measurement systems.

The look-up table (LUT) 550, mean DOP calculator 540, DOP sorter 560, OSNR calculator 570, processor 1050, 1150, 1350, and other digital signal processing units (generally, "processing units") may be implemented in hardware, software, firmware, or a combination thereof. In the preferred embodiment(s), the processing units are implemented in software or firmware that is stored in a memory and that is executed by a suitable instruction execution system. If implemented in hardware, as in an alternative embodiment, the processing units can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

Although exemplary embodiments have been shown and described, it will be clear to those of ordinary skill in the art that a number of changes, modifications, or alterations to the disclosure as described may be made. All such changes, modifications, and alterations should therefore be seen as within the scope of the disclosure.

What is claimed is:

1. A system for measuring in-band optical signal-to-noise ratio (OSNR) of signals having a signal electrical bandwidth (BS), the signals being carried in at least two polarization tributaries, the system comprising:
    a dual-polarization optical channel (DPOC) to carry the signals;
    a polarimeter comprising an input and an output, the polarimeter having a polarimeter bandwidth (BP), the BP partially overlapping with the BS, the polarimeter to measure a degree of polarization (DOP) of the signals;
    a sampler operatively coupled to the output of the polarimeter, the sampler to sample the DOP of the signals at a sampling rate and produce N digitized samples of the measured DOP, the sampling rate being at least 2BP; and
    a processor operatively coupled to the sampler, the processor comprising:
        a DOP sorter to sort the N digitized samples;
        a mean DOP calculator to calculate mean DOP from M digitized samples, M being less than N; and
        an OSNR calculator to calculate in-band OSNR as a function of the calculated mean DOP.

2. The system of claim 1, further comprising:
a spectrometer to analyze an optical spectrum of the signals, the optical spectrum comprising channel bandwidth information.

3. A system, comprising:
a polarimeter to measure a degree of polarization (DOP) of signals, the signals being carried in at least two polarization tributaries;
a sampler to produce digitized samples of the DOP from the measured DOP of the signals; and
a processor to determine optical signal-to-noise ratio (OSNR) from the digitized samples of the DOP, the processor comprising a mean DOP calculator to calculate mean DOP from the digitized samples of the DOP, the processor further comprising a component selected from the group consisting of:
  a look-up table (LUT) correlating the calculated mean DOP with the OSNR; and
  an OSNR calculator to calculate the OSNR from the calculated mean DOP.

4. The system of claim 3, the polarimeter having a polarimeter bandwidth (BP) that partially overlaps with a signal bandwidth (BS).

5. The system of claim 4, the sampler having a bandwidth that is at least 2BP.

6. The system of claim 5, the sampler to produce N digitized samples.

7. The system of claim 6, further comprising:
a DOP sorter to sort the N digitized samples, the DOP sorter further to identify M highest-value digitized samples, M being less than N; and
the mean DOP calculator to further calculate the mean DOP from the M highest-value digitized samples.

8. The system of claim 3, the processor comprising:
a DOP sorter to sort the digitized samples of the DOP; and
the mean DOP calculator to further calculate mean DOP from the sorted digitized samples of the DOP.

9. The system of claim 4, further comprising:
a low-speed polarimeter having a lower bandwidth (BP1), BP1 being less than BP, BP1, the low-speed polarimeter to measure a lower-band DOP of the signals.

10. The system of claim 9, the low-speed polarimeter to further remove polarization-dependent loss (PDL) artifacts.

11. The system of claim 9, the processor to further determine the OSNR from the measured lower-band DOP.

12. A method, comprising:
receiving signals carried in at least two polarization tributaries;
measuring a degree of polarization (DOP) for each of the signals;
sampling the measured DOP to produce digitized samples of the DOP;
calculating a mean DOP from the digitized samples of the DOP; and
calculating an optical signal-to-noise ratio (OSNR) from the calculated mean DOP.

13. The method of claim 12, sampling the measured DOP comprising:
producing N digitized samples of the DOP.

14. The method of claim 13, further comprising:
sorting the N digitized samples;
identifying M highest-value digitized samples, M being less than N; and
calculating mean DOP from the M highest-value digitized samples.

15. The method of claim 12, further comprising:
calculating a mean DOP from the digitized samples of the DOP; and
correlating the calculated mean DOP with the OSNR.

16. The method of claim 12, further comprising:
decoding the signals for additional overhead prior to calculating the mean DOP, the additional overhead being indicative of increased DOP.

17. The method of claim 12, further comprising:
analyzing an optical spectrum of the received signals.

* * * * *